Dec. 15, 1936.            J. BIJUR            2,063,903
LUBRICATING INSTALLATION
Original Filed May 28, 1925
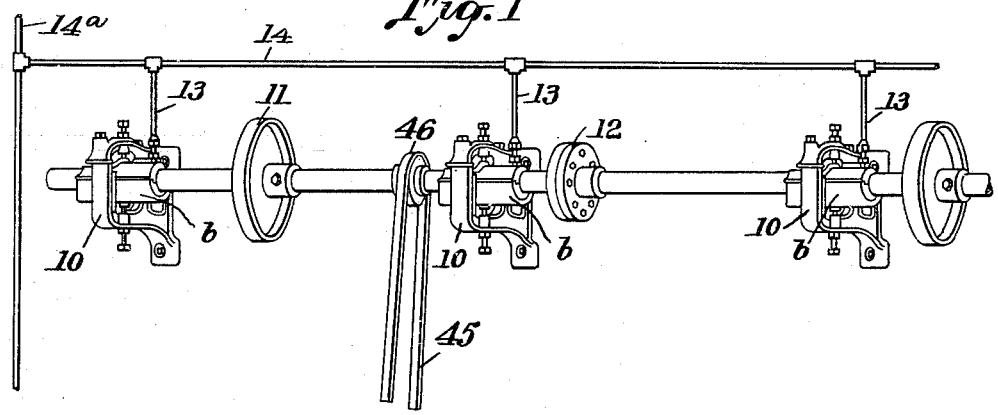
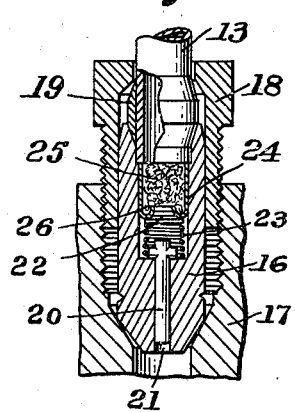
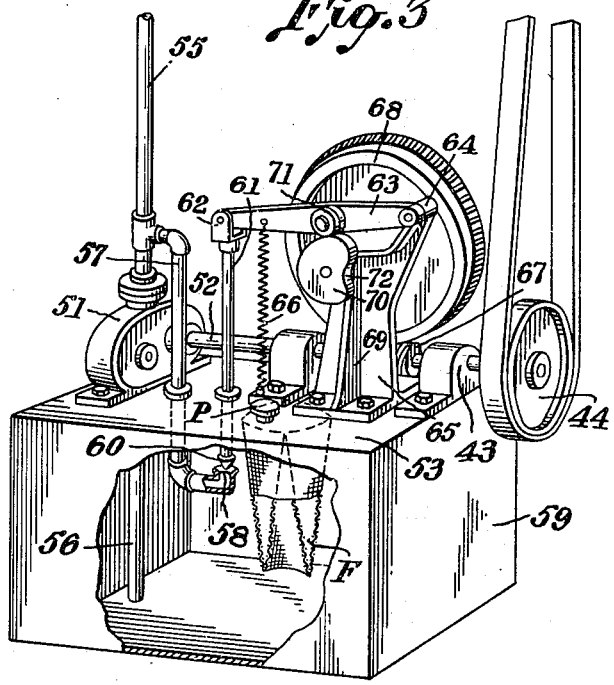
Inventor
JOSEPH BIJUR
By Dean, Fairbank,
Hirsch & Foster.
Attorneys.

Patented Dec. 15, 1936

2,063,903

UNITED STATES PATENT OFFICE 2,063,903

LUBRICATING INSTALLATION

Joseph Bijur, New York, N. Y., assignor to Auto Research Corporation, a corporation of Delaware Original application May 28, 1925, Serial No. 33,387. Divided and this application October 3, 1931, Serial No. 566,705

25 Claims. (Cl. 184—7)

My present invention relates primarily to lubrication, and more especially to lubrication from a single source of a multiplicity of separate and distinct bearings in a mechanism or installation. The invention is more especially concerned with automatic lubricating systems, that is, with systems in which the lubricant is delivered to or applied at the bearings as an incident to the driving or operation of the mechanism or installation, without the need for any special manipulation.

The invention has among its objects to provide a lubricating system of the above type, easily applied to mechanisms or mechanical installations generally, without involving material alterations thereof, and which will reliably deliver lubricant in accordance with the requirements of the various bearings or parts without deficiency or excessive overflow at any of said parts, and this substantially regardless of the complexity of the system or installation or the number or location of the parts thereof requiring lubrication.

Among other objects are to provide a system of the above type which lends itself readily to the use of lubricant of any desired degree of viscosity and which permits the application of the source of lubricant or of pressure at any convenient place either near or remote from the lubricated mechanism or at a higher or lower level with respect thereto.

Another object is to provide a lubricating system of the above type, the parts of which are inobtrusive, yet readily replaceable in the event of injury.

In the preferred application, a lubricant delivery pipe extends from the source of lubricant along various parts of the mechanism or installation and has branches or taps leading into the various bearings, so that lubricant is applied thereto in parallel under the influence of pressure applied to the head of the line.

Appropriate control elements are provided in the various branches each constructed and arranged to assure the delivery of the desired proportion of lubricant to the corresponding bearing while pressure is applied at the head of the pipe line.

The present invention is also concerned with the construction and mode of operation of the pressure source, both alone and in combination with the rest of the system, by which an intermittently or a continuously operated lubricant pressure source feeds various spaced bearings intermittently or continuously.

In a preferred embodiment lubricant pressure is applied or a charge of lubricant is forced into the head of the pipe line at predetermined intervals of actual operation of the mechanism. The pressure-operated control elements at the various outlets to the bearings determine the relative rates of emission and accordingly the proportional division between the bearings of the total quantity of lubricant emitted from the piping system. The pipe line system is preferably maintained filled with lubricant at all times by the use of appropriate valve means in the control elements so that the pressure applied to the pipe line is transmitted to the outlets through an incompressible column.

While the force for applying pressure to the pipe line may be derived from a separate source, it is preferably derived from the same source of power which operates the installation or mechanism. A speed reducing transmission may be interposed if desirable to render effective the application of pressure to the pipe line periodically after each predetermined number of cycles of operation of the installation.

In one preferred embodiment, the pump is illustratively of a rotary type driven directly from the source of power but having its inlet and its outlet normally connected directly into the tank, so that the pump normally operates to circulate the lubricant back to the tank without feeding the bearings, control means operated from a speed reducing transmission periodically effecting closure of the pump return to the tank during a perdetermined period, during which, of course, the driven rotary pump will apply pressure to the pipe line and cause feed to the bearings.

On the other hand where it is desired to provide a continuous circulation of lubricant, the lubricant pump may feed more or less continuously, be continually driven and in such case if excessive quantities of lubricant are supplied the bearings may drain by gravity through return pipes to the tank, at which appropriate filter means may be provided to intercept any particles entrained with the oil.

In the accompanying drawing in which are shown one or more of various possible embodiments of the several features of the invention, Fig. 1 is a perspective view showing a specific application of the invention to the lubrication of line shafting, Fig. 2 is a sectional view of a preferred form of outlet fitting employed, Fig. 3 is a perspective view of a form of lubricant pressure supply mechanism therefor.

In Fig. 1 I have shown an application of the invention to the lubrication of the bearings of a factory installation, a section of the line shafting, which is illustratively shown in the drawing, comprising conventional hangers 10 with the usual bearings b driving pulleys 11 and couplings 12. The bearings b are lubricated from branch pipes 13, all of which are supplied from a main feeder line 14 of metallic pipe, which may extend along various shafts of the installation and is shown broken away at 14a.

The outlets of the various branches 13 comprise control fittings applied directly into the stationary element of the bearings b, which fittings may be of any appropriate type but are preferably of the construction disclosed in the copending application of Edward H. Kocher, Serial No. 22,014, filed April 10, 1925, now Patent No. 1,943,326, one of said fittings being shown on an enlarged scale in Fig. 2. Inasmuch as this fitting is not by itself claimed herein, it need merely be briefly noted that it may comprise a cartridge 16 placed in a corresponding socket 17 in the bearing member and encircled by a bushing 18 threaded into said socket member, urging the inner end of said cartridge into oil-tight engagement with the inner reduced end of the socket, the pipe 13 extending into said cartridge and being tightly connected thereto by a compression coupling 19 tightened automatically by the mere process of applying the threaded bushing 18 in position. Preferably the cartridge includes a high restricted outlet opening determined by a restriction pin 20 of accurately predetermined diameter extending into a corresponding axial bore 21 in the cartridge of accurately predetermined diameter, but a few thousandths of an inch larger than that of the pin. The cartridge also houses a check valve 22 normally urged by a spring 23 against a seat 24. To prevent the passage of chips or scale to the valve seat or therebeyond, a plug 25 of felt is inserted adjacent the valve seat which is preferably formed as a part of a thimble 26 press-fitted into the cartridge, said thimble constituting a stop for the inner end of the pipe 13.

In Fig. 3 is shown one embodiment of pump which may be applied to the lubrication of a factory installation, such as shown in Fig. 1. In this embodiment, a rotary oil pump 51 is actuated by power derived from the lubricated mechanism. The driving shaft 52 of the pump, which is mounted in bearings 43 on the tank cover 53, carries a pulley 44 at its end driven by a belt 45 from pulley 46 on the line shafting. The pump may also be mounted on the tank cover and is adapted to deliver pressure through header 55 to the distributing system. The pump has an inlet pipe 56 extending downward to near the bottom of the oil tank and the header or outlet 55 is tapped by a branch pipe 57 extending downward through the cover into the tank and having a valve seat 58 at its outlet end normally open to communicate with the interior of the tank 59. The tank 59 is provided with an inlet P for filling. The rotary pump is driven throughout the period of operation of the installation, but cannot normally apply pressure to the pipe line, since the oil drawn thereby through pipe 56 would normally be discharged through the branch pipe 57 back into the tank.

Speed reducing means is provided to effect periodically closure of the valve seat 58 for a short time so that in the operation of the system and of the pump 51 during the periods of such closure, lubricant pressure would be effectively exerted by the pump 51 upon the pipe line 55. For this purpose, the valve 60 cooperating with seat 58 has a stem 61 extending through the tank cover pivoted by a clevis 62 to a lever 63 pivotally supported at its opposite end 64 on a bracket 65 upon the cover of the tank, a coil spring 66 fixed at one end to the lever 63 and at the other to the tank cover normally urging the valve toward seated position. Upon the driving shaft 52 is a worm 67 operating a worm wheel 68 upon a shaft 69 mounted in brackets 65 on the cover. On shaft 69 is also mounted a cam disk 70 coacting with a roller 71 on the lever 63. The cam disk in normal position shown in the drawing, elevates the roller 71 so as to maintain the valve 60 away from its seat 58. The cam disk has a depression or flat 72 which when it comes into registry with the roller 71 in the slow rotation of the cam with the worm wheel, will permit the spring 66 to draw the roller downward and thereby draw the valve stem 61 downward, causing the valve 60 to close against its seat 58 during which closure period, pressure is applied from the rotary pump to the pipe system. Whereby a slow discharge of lubricant through the outlet terminals into the corresponding bearings will ensue, the various check valves 22 cracking off their seats to permit flow thereabout.

In the continued operation of the system, as the flat moves away from the roller and the rounded part of the cam again engages the roller, the latter is elevated to draw the valve away from its seat and thereby cause the pump again to operate without exerting pressure on the line. Upon such release of pressure the emission of lubricant to the bearings will cease and the check valves 22 will be reseated by their springs.

It will be seen that in the present embodiment, the pump is rendered effective for a predetermined number of revolutions of its driving shaft, and, accordingly, of the lubricated mechanism, so that the quantity of lubricant of a given viscosity delivered to the bearings at each operation is measured to a fair degree of accuracy.

Accordingly, by my invention, after a predetermined number of cycles of operation of the driving means of the lubricated mechanism, a charge of oil is propelled at substantially uniform pressure, wholly independent of the regularity, speed or continued operation of the lubricated mechanism, past rate-flow controlling outlets in parallel to the bearings.

The check valve 22 at the various outlets at the head of the pipe line, assures that the line at all times remains filled with lubricant, so that the pressure is effectively transmitted in all cases through an incompressible column of liquid to each of the restriction outlet fittings and the irregularities which would ensue were air permitted to enter into the pipe line are wholly eliminated. The restriction outlets in themselves controlling the relative rates of discharge substantially regardless of the lengths of the pipe line intervening therebetween and the pump, the distribution of lubricant is reliable.

The system will at no time become clogged with dirt or dust since the filter F prevents the entry of any dirt into the tank and the strainers 25 intercept any scale or chips entrained with the oil on its way to the bearings. The finely restricted outlets maintain their original setting and require no separate adjustment throughout operation. They will not become clogged since, as noted, no dirt or dust can reach them. It will be noted that lubricant of substantially any degree of viscosity can be used.

Should it be desired to replace an outlet fitting, this can be done without in any way disturbing the system, as any such fitting may be removed from the bearing without likelihood of any substantial loss from the line, since all the other valves and outlets remain closed to prevent the entry of air into the line, which would be a prerequisite with small bore pipe, to the leak of lubricant from the single opening temporarily effected during such replacement.

While the drawing shows but a small section of line shafting, it will be understood that the invention is applicable to even the most extensive factory installation, a single pump being suitable for supplying any number of bearings throughout a building or buildings. It will be understood that while I prefer to charge the pump from the lubricated mechanism, it could be charged in any other manner, which would permit normal discharge whenever the mechanism should be lubricated.

The present application is a division of application Serial No. 33,387, filed May 28, 1925.

It will be understood that the pump construction of Fig. 3 with its intermittent pressure application may be utilized to lubricate other mechanisms or arrangements of bearings than is disclosed in Fig. 1 and to feed distributing systems with other types of flow controlling outlets than is disclosed in Fig. 2, such other type of flow controlling outlets being disclosed, for example, in the prior Patents 1,975,920 and 2,017,848. The subject matter of the present application is continued in part in application Ser. No. 635,526, filed September 30, 1932, and such matters shown and described in the present application, but not claimed herein are covered in said continuing application. As many changes could be made in the above construction, and many apparently widely different embodiments of this invention could be devised without departing from the scope thereof, it is intended that all matter contained in the above description or shown in the accompanying drawing shall be interpreted as illustrative and not in a limiting sense.

I claim:

1. In a mechanical installation, in combination, a lubricant pipe having a multiplicity of branches leading to the several bearings of the mechanism, flow controlling outlets at said bearings determining the distribution of lubricant from the line thereto, a rotary pump feeding lubricant into the pipe line for delivering at said bearings, a tank supplying said pump, said pump normally having communication both at its inlet and its outlet with said tank, so as to operate idly, and means actuated from the mechanism to periodically close off the outlet of said pump with respect to said tank, whereby during said closing off operation, the pump will function operatively to feed lubricant from the tank into the pipe line.

2. In a mechanical installation, in combination, a lubricant pipe having a multiplicity of branches leading to the several bearings of the mechanism, flow controlling outlets at said bearings determining the distribution under pressure of lubricant from the line thereto, a rotary pump feeding lubricant into the pipe line for delivery at said bearings, a tank supplying said pump, said pump normally having communication both at its inlet and outlet with said tank, so as to operate idly, said outlet to the tank having a valve seat, a valve for coaction therewith, and speed reducing means actuated from the installation for periodically unseating said valve.

3. The combination set forth in claim 2 in which the speed reducing transmission mechanism includes a cam operating on the stem of the valve and having a depression which when brought into registry with the stem permits seating of the valve.

4. A centralized automatic lubricating system for a multiplicity of rotary bearing structures, said system comprising a trunk line having an inlet and having a multiplicity of branched outlets leading to the respective bearings, said outlets including highly resistant, prerated, flow rate metering fittings in the respective branches constructed and arranged to permit flow during application of pressure on the system and to inhibit flow when pressure ceases, an additional valved outlet of low resistance when opened, a pump for exerting propulsive lubricant pressure through the inlet of said trunk line to deliver quantities of lubricant in excess of the requirements of the bearings and means for periodically opening said additional outlet and thereby preventing said pump from exerting propulsive pressure on said outlets, including metering fittings.

5. A centralized automatic lubricating system for a multiplicity of rotary bearing structures, said system comprising a trunk line having an inlet and having a multiplicity of branched outlets leading to the respective bearings, said outlets including highly resistant, prerated, flow rate metering fittings in the respective branches constructed and arranged to permit flow during application of pressure on the system and to inhibit flow when pressure ceases, a rotary gear pump for exerting propulsive pressure to advance lubricant to the trunk line and branches for emission through the line metering outlets, a rotary reduction drive associated with said pump, and a reciprocating control actuated from said reduction drive for controlling the propulsion of lubricant by said rotary means into said trunk line, said outlets each including automatically seated valves, unseated by lubricant pressure application to permit lubricant flow toward the bearing, and when seated preventing reverse flow of lubricant from the bearings and consequent drainage, the outlets and the pump being correlated so that the pump will discharge into a substantially completely lubricant filled system, whereby the discharge pressure of the pump will be substantially directly applied at and to the outlets, as a result of which the discharge of the pump will be substantially retarded and diminished by the back pressure set up by the outlets, said outlets having a tremendously greater retarding effect upon the flow of lubricant than the bearings of such high degree that they will predominately regulate the proportioning of lubricant among the several bearings, said outlets absorbing substantially all of the pressure of said pump with the result that the lubricant will be discharged very slowly out of said outlets into the bearings at a relatively low pressure.

6. In a mechanical installation, in combination, a lubricant pipe having a multiplicity of branches leading to the several bearings of the mechanism, flow controlling outlets at said bearings determining the distribution of lubricant from the line thereto, a continuous pump feeding lubricant into the pipe line for delivering at said bearings, a tank supplying said pump, said pump normally having communication both at its inlet and its outlet with said tank, so as to circulate the oil without feed to the bearings, and means actuated from the mechanism to periodically close off the outlet of said pump with respect to said tank, whereby during said closing off operation, the pump will function operatively to apply lubricant pressure from the tank into the pipe line.

7. A centralized automatic lubricating system for a multiplicity of rotary bearing structures, said system comprising a trunk line having an inlet and having a multiplicity of branched outlets leading to the respective bearings, said outlets in the respective branches constructed and arranged to permit flow during application of pressure on the system and to inhibit flow when pressure ceases, an additional valved outlet of low resistance when opened, a pump for exerting propulsive lubricant pressure through the inlet of said trunk line to deliver quantities of lubricant in excess of the requirements of the bearings and means for periodically opening said additional outlet and thereby preventing said pump from exerting propulsive pressure on said outlets, including metering fittings.

8. A central lubricating installation for a mechanism having a plurality of spaced bearings which comprises a trunk and branch piping system, said branches leading to said bearings and including spring-seated valve drip plug controls to prevent emission of lubricant to the bearings except when lubricant pressure is applied in the trunk, a pressure source connected to said trunk continuously driven from said mechanism with a discharge greatly in excess of the bearing requirements, a reservoir supplying lubricant to and receiving excess lubricant from said pressure source, said source, reservoir and system being so constructed and arranged that the source will normally feed to the reservoir and a valve arrangement actuated from said mechanism for periodically stopping return feed from the source to the reservoir and causing application of pressure to said controls.

9. A lubricating installation for a mechanism having a plurality of distributed bearings, comprising a branched piping system with an inlet and a plurality of outlets to the bearings, each of said outlets including a flow metering fitting, a pump actuated to feed lubricant continuously under pressure and an automatic valve-controlled by-pass arrangement for periodically causing said pump to exert pressure in the piping system and to thereby cause emission at the bearings.

10. In a central lubricating installation, a distributing system and a gear pump feeding said system, a reservoir supplying said pump, an unrestricted by-pass from said gear pump back to said reservoir, a valve on said by-pass and automatic means to close said valve and cause said gear pump to discharge entirely into said system.

11. In a central lubricating installation, a gear pump, a reservoir supplying said gear pump, a restricted distributing system supplied from said pump, an unrestricted return flow passage from said pump to said reservoir normally receiving substantially the entire discharge of said pump and automatically actuated means to close said passage at intervals causing the entire discharge of said pump to flow into said system.

12. A central lubricating installation for a plurality of spaced bearings which comprises a trunk and branch piping system, said branches leading to said bearings and including flow-control members having spring-seated valves to prevent emission of lubricant to the bearings except when comparatively high lubricant pressure is applied in the trunk, a continuously driven pressure source connected to said trunk and having a discharge greatly in excess of the bearing requirements, a reservoir supplying lubricant to and receiving excess lubricant from said pressure source, said source, reservoir and system being so constructed and arranged that the source will normally return the lubricant to the reservoir through a by-pass means ahead of the piping system and a valve arrangement actuated from the pressure source driving means for periodically stopping return of lubricant from the source to the reservoir through said by-pass means and causing, due to the increase of pressure in said system, the opening of the valves in said flow-control members to feed lubricant to the bearings.

13. In a lubricating system, the combination of a supply conduit, one or more pressure-responsive feeders supplied by said conduit, pressure-producing means for supplying oil under pressure to said conduit, said means having a capacity sufficient to cause said feeder or feeders to respond, and power-operated, pressure-controlling by-pass means distinct from and operating independently of the pressure produced by said pressure-producing means, and having a predetermined cycle of operation, to cause a drop of said pressure by by-passing oil to the source of supply and thereby ceasing to supply oil to said conduit adjacent to the inlet of said conduit in an amount sufficient to cause said feeder or feeders to feed.

14. In a lubricating system, the combination of one or more pressure-responsive feeders, a reservoir, a feeder-supplying conduit having an inlet from said reservoir and a by-pass back to said reservoir but no outlet outwardly beyond said feeder or feeders, pressure-producing means for causing oil to flow under pressure from said reservoir into said inlet, said means having a capacity sufficient to produce a pressure sufficient to cause said feeder or feeders to respond, and power-operated, pressure-controlling means having a predetermined cycle of operation intermittently to open said by-pass to cause the pressure to drop sufficiently to prevent said feeder or feeders from responding.

15. Lubricating apparatus comprising, in combination, a conduit system, a pump for producing pressure in said system, a valve cooperating with said pump to cause fluctuation of said pressure, and one or more pressure-responsive feeders supplied by said pump and which open and close in response to said fluctuation.

16. Lubricating apparatus comprising, in combination, a conduit system, a pump for producing pressure in said system, a valve to open and close said system at intervals to cause pulsations of said pressure, and one or more pressure-responsive feeders supplied by said pump and which open and close in response to said pulsations.

17. Lubricating apparatus comprising, in combination, a conduit system, a pump for producing pressure in said system, a pressure-controlling valve, means for operating said valve intermittently to cause pulsations of said pressure, and one or more pressure-responsive feeders supplied by said pump and which have feeding and non-feeding periods corresponding with said pulsations.

18. Lubricating apparatus comprising, in combination, a conduit system having an outlet, one or more pressure-responsive feeders supplied thereby, a valve for said outlet, a pump supplying said system and having a capacity insufficient to produce a pressure great enough to cause said feeders to respond when said valve is open, the capacity of said pump being sufficient to produce a pressure great enough to cause said feeders to respond when said valve is closed, and means to open and close said valve intermittently.

19. Lubricating apparatus comprising, in combination, a conduit system having an outlet, one or more pressure-responsive feeders supplied thereby, a valve for said outlet, a pump supplying said system and having a capacity insufficient to produce a pressure great enough to cause said feeders to respond when said valve is open, the capacity of said pump being sufficient to produce a pressure great enough to cause said feeders to respond when said valve is closed, and means to open and close said valve intermittently and to cause it to remain open longer than it is closed.

20. In a machine installation, in combination, a plurality of bearings, a lubricant pipe system having outlets in parallel delivering to the bearings, flow control fittings in said outlets to determine the division of lubricant from said pipe line to said bearings, a pump having an outlet delivering to the head of said pipe line and also having another outlet which is relatively unobstructed, means actuated from said installation furnishing the energy for actuating said pump, said means including a control element to periodically effect application of pressure from the pump to the pipe line, said control element having an automatically actuated valve, said valve closing said unobstructed outlet of said pump, whereby periodic pressure applications are attained.

21. In a lubricating installation having a plurality of bearings to be lubricated, a non-circulatory distributing piping system with an inlet and a plurality of outlets to said bearings, flow metering devices associated with said outlets, a central lubricant reservoir, a central lubricant pump fed from said reservoir and means to cause said pump alternately to feed lubricant at a low pressure back to the reservoir and then to feed lubricant at a high pressure to said piping to cause said outlets to emit lubricant to said bearings.

22. In a lubricating installation having a plurality of bearings to be lubricated, a non-circulatory distributing piping system with an inlet and a plurality of outlets to said bearings, flow metering devices associated with said outlets, a central lubricant reservoir, a central lubricant pump fed from said reservoir and means to cause said pump alternately to feed lubricant at a low pressure back to the reservoir and then to feed lubricant at a high pressure to said piping to cause said outlets to emit lubricant to said bearings, said pump being immersed in said reservoir, having an outlet connected to said inlet, said last mentioned means including a return from the outlet of the pump to the reservoir, a valve which is opened to permit circulation of lubricant through said return to the reservoir and which is closed to create a high pressure.

23. In a lubricating installation having a plurality of bearings to be lubricated, a non-circulatory distributing piping system with an inlet and a plurality of outlets to said bearings, flow metering devices associated with said outlets, a central lubricant reservoir, a central lubricant pump fed from said reservoir, a return to the reservoir, and means to cause said pump alternately to circulate lubricant at a low pressure through the return to the reservoir and then to create a high pressure in said piping to cause said outlets to emit lubricant to said bearings, said last mentioned means including means to cause said circulation for relatively long periods and said high pressure to last for a relatively short period.

24. In a lubricating installation, a distributing system having flow metering outlets, each provided with a spring-seated check valve, and a central source of lubricant pressure normally feeding said system at a pressure insufficient to open said check valves and provided with means to cause a feed at intervals sufficient to open said check valves.

25. In a centralized lubricating installation for a mechanism having a plurality of spaced and distributed bearings requiring relatively minute quantities of lubricant at intervals during operation of the mechanism, said installation including a central reservoir, a central pump receiving lubricant from said reservoir, a drive for said pump deriving power continuously from said mechanism, a branched distributing conduit system having an inlet connected to the outlet of said pump and a plurality of outlets to the bearings to be lubricated, flow controlling obstructions in the line of flow to said outlets to meter the lubricant supply to each of the bearings, said conduit system also having an unobstructed additional outlet to said reservoir provided with a valve and means deriving power from the mechanism to periodically close said valve.

JOSEPH BIJUR.